US008766786B2

(12) United States Patent
Radivojevic

(10) Patent No.: US 8,766,786 B2
(45) Date of Patent: Jul. 1, 2014

(54) DEVICE AND METHOD FOR PROVIDING TACTILE INFORMATION

(75) Inventor: Zoran Radivojevic, Cambridge (GB)

(73) Assignee: Nokia Corporation, Espoo (FI)

( * ) Notice: Subject to any disclaimer, the term of this patent is extended or adjusted under 35 U.S.C. 154(b) by 709 days.

(21) Appl. No.: 12/866,237

(22) PCT Filed: Feb. 4, 2008

(86) PCT No.: PCT/EP2008/000855
§ 371 (c)(1),
(2), (4) Date: Aug. 4, 2010

(87) PCT Pub. No.: WO2009/097866
PCT Pub. Date: Aug. 13, 2009

(65) Prior Publication Data
US 2010/0315212 A1    Dec. 16, 2010

(51) Int. Cl.
*G08B 6/00*            (2006.01)

(52) U.S. Cl.
USPC .............. 340/407.2; 340/407.1; 340/815.4; 340/815.47; 345/156; 345/173; 116/205; 901/32

(58) Field of Classification Search
CPC ...... G09B 6/00; G09B 21/003; G09B 21/004; G09B 21/007; G09B 21/001; G09B 21/009; G09B 21/02; G09B 21/04; G09B 21/0261; G06F 1/1613; G06F 3/016; G06F 3/044; G06F 3/03547; G06F 3/0416; G06F 2203/04809; A63F 2300/1037; A63F 2300/1025; A63F 2300/1075

USPC ............. 340/407.1, 407.2, 815.4–815.47; 345/156, 173; 116/205; 901/32
See application file for complete search history.

(56) References Cited

U.S. PATENT DOCUMENTS

| 5,580,251 | A | 12/1996 | Gilkes et al. |
| 5,942,970 | A | 8/1999 | Norman |
| 6,703,924 | B2 * | 3/2004 | Tecu et al. ................... 340/407.1 |
| 7,088,342 | B2 * | 8/2006 | Rekimoto et al. ............ 345/169 |
| 8,207,945 | B2 * | 6/2012 | De Jong et al. .............. 345/173 |
| 2002/0003469 | A1 * | 1/2002 | Gupta ........................ 340/407.1 |
| 2006/0014123 | A1 | 1/2006 | Hanley |
| 2006/0024647 | A1 | 2/2006 | Chesnais |
| 2008/0122589 | A1 * | 5/2008 | Ivanov ....................... 340/407.1 |
| 2009/0085882 | A1 * | 4/2009 | Grant et al. .................. 345/173 |

OTHER PUBLICATIONS

IEEE Standard for Information technology—Telecommunications and information exchange between systems—Local and metropolitan area networks—Specific requirements Part 11: Wireless LAN Medium Access Control (MAC) and Physical Layer (PHY) Specifications, IEEE Std 802.11™—2007 (Revision of IEEE Std 802.11-1999) Jun. 12, 2007.

(Continued)

*Primary Examiner* — George Bugg
*Assistant Examiner* — Sharmin Akhter
(74) *Attorney, Agent, or Firm* — Harrington & Smith

(57) ABSTRACT

A user interface comprising a display arranged to display visual content and a tactile surface arranged to convey a tactile representation, wherein said tactile representation is based on said visual content. This has the advantage of enabling a user to perceive content being displayed to him with less cognitive effort.

19 Claims, 7 Drawing Sheets

(56) References Cited

OTHER PUBLICATIONS

International Search Report and Written Opinion of the International Searching Authority for corresponding International Patent Cooperation Treaty Application PCT/EP2008/000855, dated Sep. 17, 2008, 13 pages.

"Working with WideoTIM", ABTIM—Advanced Displays for the Blind, Mar. 13, 2006, www.abtim.com/home_e_/usage/usage.html.

* cited by examiner

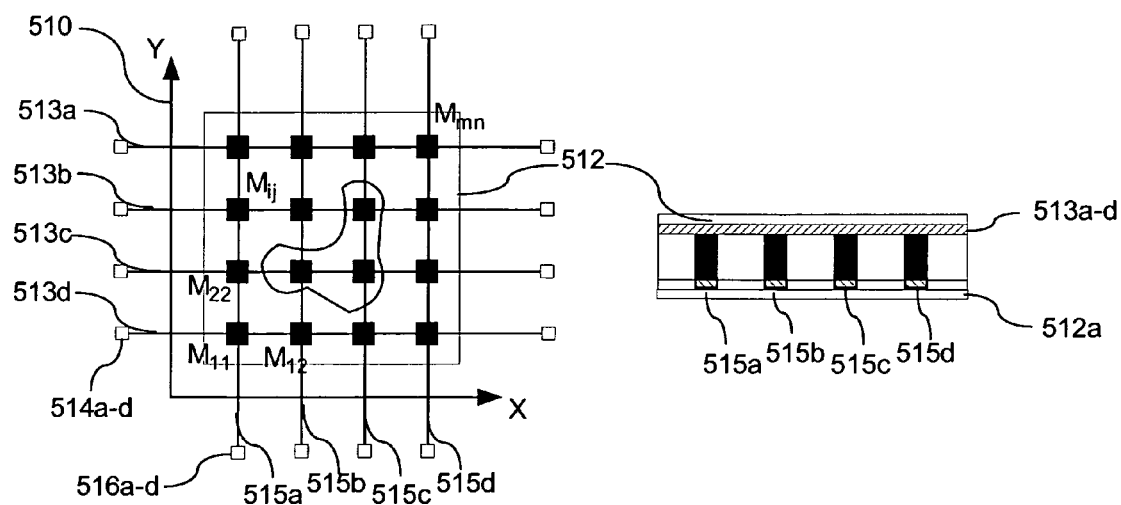
Fig 5A
Fig 5B
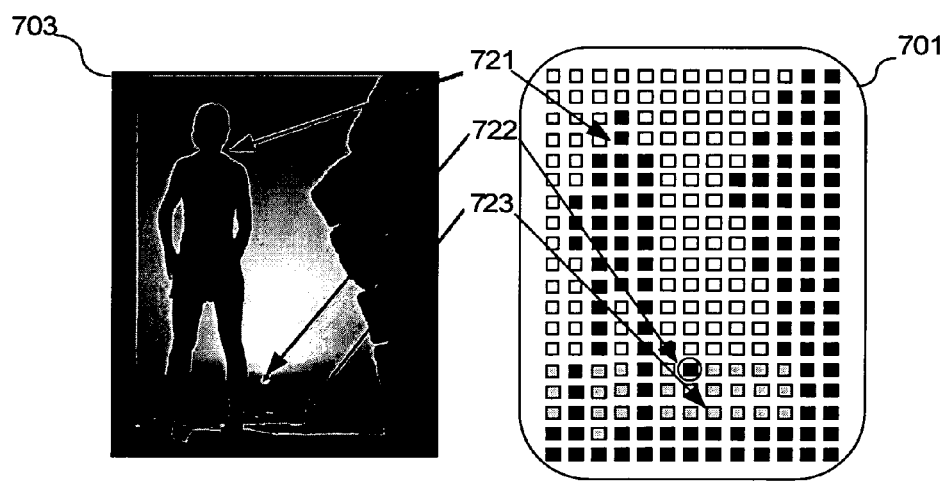
Fig 7

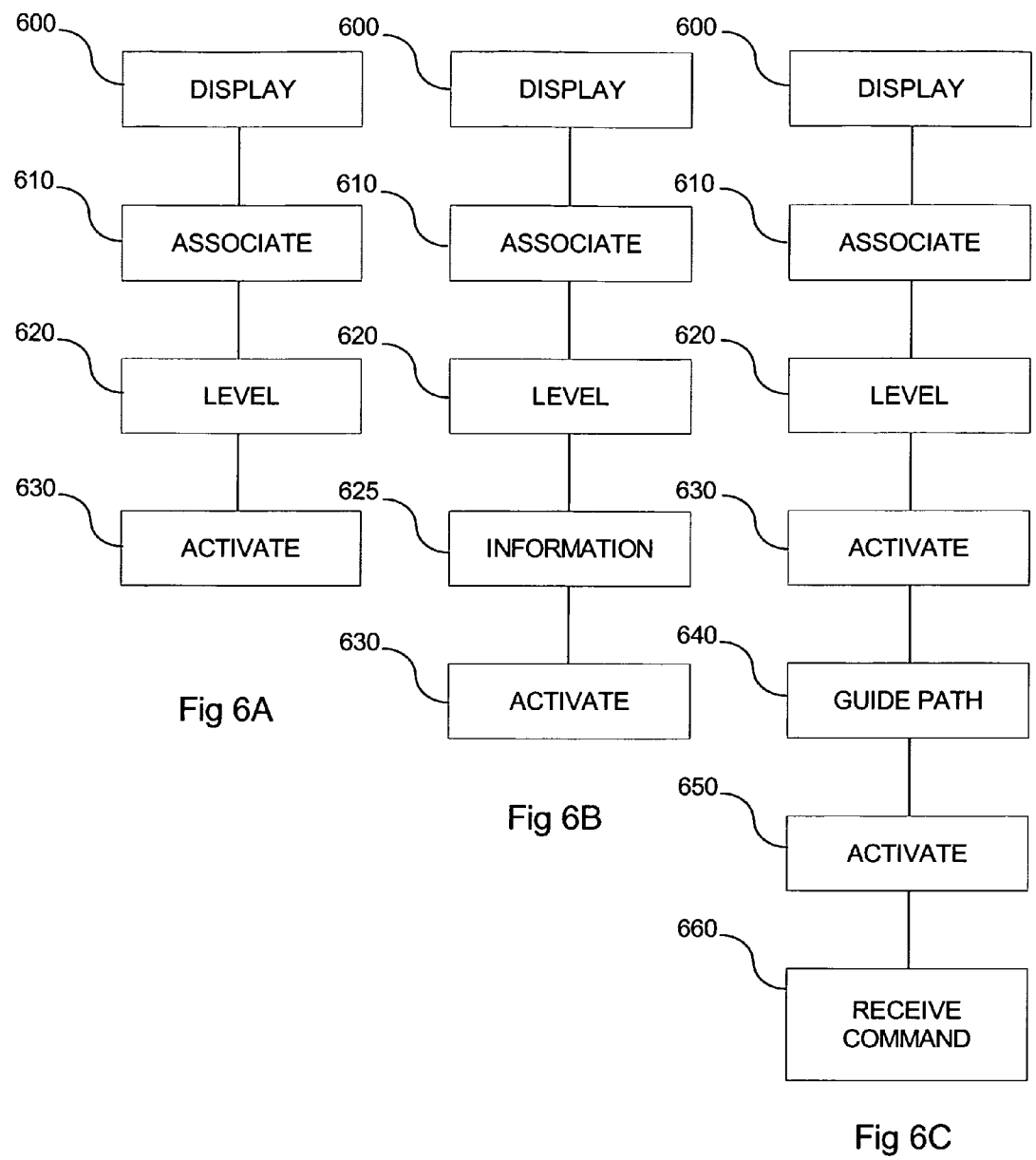

DEVICE AND METHOD FOR PROVIDING TACTILE INFORMATION

RELATED APPLICATION

This application was originally filed as PCT Application No. PCT/EP2008/000855 filed Feb. 4, 2008.

FIELD

The present application relates to a device and a method for providing tactile information, and in particular to a device and a method for providing tactile information relating to visual content of a screen image.

BACKGROUND

More and more electronic devices such as mobile phones, MP3 players, Personal Digital Assistants (PDAs) are becoming smaller and smaller while having more and more information stored and/or accessible through them. Users are relying on these devices and becoming all the more dependant on them.

The environments in which these devices are used are also becoming more and more hectic with higher demands on fast access and multitasking, and not only in a professional environment but also in private and social environments. For example a user should be able to read a book, while holding a grocery bag in a rattling subway train and still be able to access the information stored in the device for the device to live up to the many requirements posed upon it by a user buying and using the device.

As the devices grow in complexity so does the number of applications and the information stored therein and it becomes increasingly difficult for a user to maintain a clear overview of all the data and possibilities available. Modern Graphical User Interfaces, GUIs, overcome this to some extent by providing a user with a graphical presentation of the data, options and applications available in a visual presentation of the device and its content. The human mind is well-equipped to handle visual content and is able to differentiate between objects that are very similar which provides user interface designers with many options as how to present certain data. However, the cognitive processes required to interpret the visual content requires a high level of concentration and due to the increasing complexity as discussed above the view of all the options etc. can easily become difficult and strenuous to overview or even become confusing and many users find themselves spending to much time looking for the wanted or correct option, application etc which is frustrating and sometimes the user gives up and stops using features that are difficult to find or maintain an overview of.

The GUIs are also a nightmare for persons with seeing disabilities.

Some attempts at alleviating this have been done by using various audio visual features. These have the drawback that they require the user to be able to hear the signals clearly which is not always possible in situations such as in noisy environments (underground trains and busses), in silent environments (meetings, conferences) or when the user simply has hearing difficulties, temporary or permanent.

SUMMARY

On this background, it would be advantageously to provide a device and a method that overcomes or at least reduces the drawbacks indicated above by providing a device having an increased device-user interaction and is able to communicate information affecting more than one sense.

The disclosed embodiments provide a user interface comprising a display arranged to display visual content and a tactile surface arranged to convey a tactile representation, wherein said tactile representation is based on said visual content. This has the advantage of enabling a user to perceive content being displayed to him with less cognitive effort.

Additionally and/or alternatively the tactile surface comprises a plurality of vibrator elements, each vibrator element being associated with at least one pixel of said display, each pixel having a level of illumination and wherein said vibrator element is arranged to be activated according to said associated at least one pixel's level of illumination thereby forming a tactile representation of said visual content. This has the advantage of conveying a tactile representation and details thereof of the visual content through a tactile feel to a user. When the level of illumination is related to colours or intensity the tactile representation conveys nuances of the visual content to a user.

Additionally and/or alternatively the tactile surface is further arranged to convey information relating to said visual content. This has the advantage of providing the user with further information regarding the visual content without increasing the cognitive effort.

Additionally and/or alternatively the information is related to one feature chosen from the group comprising: status, help and guide information.

Additionally and/or alternatively the tactile surface is arranged to generate a guiding path by activating at least one of a plurality of vibrator elements irrespective of said visual content. This has the advantage of guiding a user by touch and feel to an item that may be difficult to perceive in the visual content.

Additionally and/or alternatively the tactile surface is further arranged to receive touch input. This enables a user to also communicate through the tactile surface thus coupling the visual content, the tactile representation and the operative status of the user interface in an intuitive way requiring only a minimum of finger movements to operate.

Additionally and/or alternatively the display is arranged on a front side of said user interface and said tactile surface is arranged on a back side of said user interface opposite to the front side of said user interface. This makes it easy for a user to hold a device incorporating such a user interface and it also saves space on said device through the realisation that the tactile representation does not need to be seen. Only felt.

Additionally and/or alternatively the tactile surface has a spatial extent in the same plane as said back side of said user interface and said display has a spatial extent in the same plane as said front side of said user interface and said and wherein said spatial extents substantially overlaps each other when viewed at a straight angle from said front side and wherein each of said plurality of vibrator elements is associated to said at least one pixel which overlaps with said vibrator element's position on said tactile surface when viewed at a straight angle from said front side so that said tactile representation corresponds spatially to said displayed visual content. This enables a user to more easily and intuitively associate the tactile representation with the visual content or visual image.

Additionally and/or alternatively the vibrator elements are piezo-electric elements.

Additionally and/or alternatively the user interface is comprised in a device.

The disclosed embodiments provide a method for providing a tactile representation of a visual content being displayed on a display comprising associating a tactile surface with said visual content. This enables a user to perceive visual content more easily and with less cognitive effort as the visual content is supplemented with a tactile representation requiring less cognitive effort to perceive.

Additionally and/or alternatively the method according to above is also for providing tactile representation of visual content in an apparatus, said apparatus comprising a plurality of vibrator elements and a display having a plurality of pixels each having a level of illumination, said method comprising associating at least one of said vibrator elements with at least one pixel and activating said vibrator elements according to said associated at least one pixel's level of illumination. This enables the tactile representation to provide the user with details regarding the visual content or image.

Additionally and/or alternatively the method further comprises activating at least one of said plurality of vibrator elements regardless of an associated pixel's level of illumination to convey information regarding said visual content to a user.

Additionally and/or alternatively the information is related to a status of said visual content or an item associated with said visual content. This has the advantage of providing a user with information otherwise lost in the tactile representation and that may be difficult to perceive in the visual image.

Additionally and/or alternatively the information is related to guidance information relating for an item associated with said visual content.

Additionally and/or alternatively the method further comprises activating at least one vibrator elements adjacent to an activated vibrator-element to form a tactile path leading to said activated vibrator-element. Additionally and/or alternatively the activated vibrator element is indicative of a next action. This provides a user with some help or guidance as to what are recommended actions, next possible actions, items of special interest etc.

Additionally and/or alternatively the plurality of vibrator elements form a tactile surface and said method further comprising receiving a touch command through said tactile surface. This enables a user to associate the tactile representation, the visual content and the operative status of a device more closely in an intuitive way requiring a minimum of finger movements.

Additionally and/or alternatively the level of illumination is dependant on a colour or an intensity of said at least one pixel. This enables the tactile representation to convey nuances of the visual content.

Additionally and/or alternatively for all embodiments herein the vibrator element and the associated pixels are associated so that they form a perceived information entity. Additionally these information perceived entities can be grouped or added to each other to form larger and/or entities of a varying size depending on the visual content. This provides a natural coupling of the tactile feel and the visual perception of the content being displayed to a user viewing a device. Alternatively the pixel group is dislocated in relation to the associated vibrator element to account for a viewing angle.

The disclosed embodiments also provide a user interface comprising display means for displaying visual content, tactile means for generating a tactile representation based on said visual content and tactile means for conveying a tactile representation on a tactile surface. This user interface and the alternatives described below have the same advantages as described for the user interfaces above.

Additionally and/or alternatively the tactile means comprise a plurality of vibrator means, each vibrator means being associated with at least one pixel of said display means, each pixel having a level of illumination and wherein said vibrator means is arranged to be activated according to said associated at least one pixel's level of illumination thereby forming a tactile representation of said visual content.

Additionally and/or alternatively the user interface further comprises means for conveying information relating to said visual content.

Additionally and/or alternatively the information is related to one feature chosen from the group comprising: status, help and guide information.

Additionally and/or alternatively the user interface further comprises means for generating a guiding path by activating at least one of a plurality of vibrator means irrespective of said visual content.

Additionally and/or alternatively the user interface further comprises means for receiving touch-input through said tactile means.

Additionally and/or alternatively the display means are arranged on a front side of said user interface and said tactile surface is arranged on a back side of said user interface opposite to the front side of said user interface.

Additionally and/or alternatively the tactile surface has a spatial extent in the same plane as said back side of said user interface and said display means have a spatial extent in the same plane as said front side of said user interface and wherein said spatial extents overlaps each other when viewed at a straight angle from said front side and wherein each of said plurality of vibrator elements is associated to said at least one pixel which overlaps with said vibrator element's position on said tactile surface when viewed at a straight angle from said front side so that said tactile representation corresponds spatially to said displayed visual content.

Additionally and/or alternatively the vibrator elements are piezo-electric elements.

The disclosed embodiments also provide a device incorporating any of the user interfaces described above. The disclosed embodiments also provide a computer readable medium including at least computer program code for controlling a user interface comprising a display and a tactile surface, said computer readable medium comprising software code for conveying a tactile representation of said visual content on said tactile surface.

Additionally and/or alternatively the tactile surface comprises a plurality of vibrator elements, said computer readable medium further comprising software code for associating at least one of said plurality of vibrator elements with at least one pixel of said display and software code for activating said vibrator element according to said a level of illumination of said at least one pixel.

The disclosed embodiments also provide a device arranged to read a computer readable medium according to above and execute said software code.

Additionally and/or alternatively anyone of the devices described above is a mobile terminal, a mobile communication terminal, a mobile web browser or a mobile telephone.

Further objects, features, advantages and properties of device, method and computer readable medium according to the present application will become apparent from the detailed description.

BRIEF DESCRIPTION OF THE DRAWINGS

In the following detailed portion of the present description, the teachings of the present application will be explained in more detail with reference to the example embodiments shown in the drawings, in which:

FIG. 6 *a, b* and *c* are flow charts describing each a method according to an embodiment, FIG. 7 is an example of a screen view being handled by an embodiment.

DETAILED DESCRIPTION

In the following detailed description, the device, the method and the software product according to the teachings for this application in the form of a cellular/mobile phone will be described by the embodiments. It should be noted that although only a mobile phone is described the teachings of this application can also be used in any electronic device such as in portable electronic devices such as laptops, PDAs, mobile communication terminals, electronic books and notepads and other electronic devices offering access to information.

Figure 1:
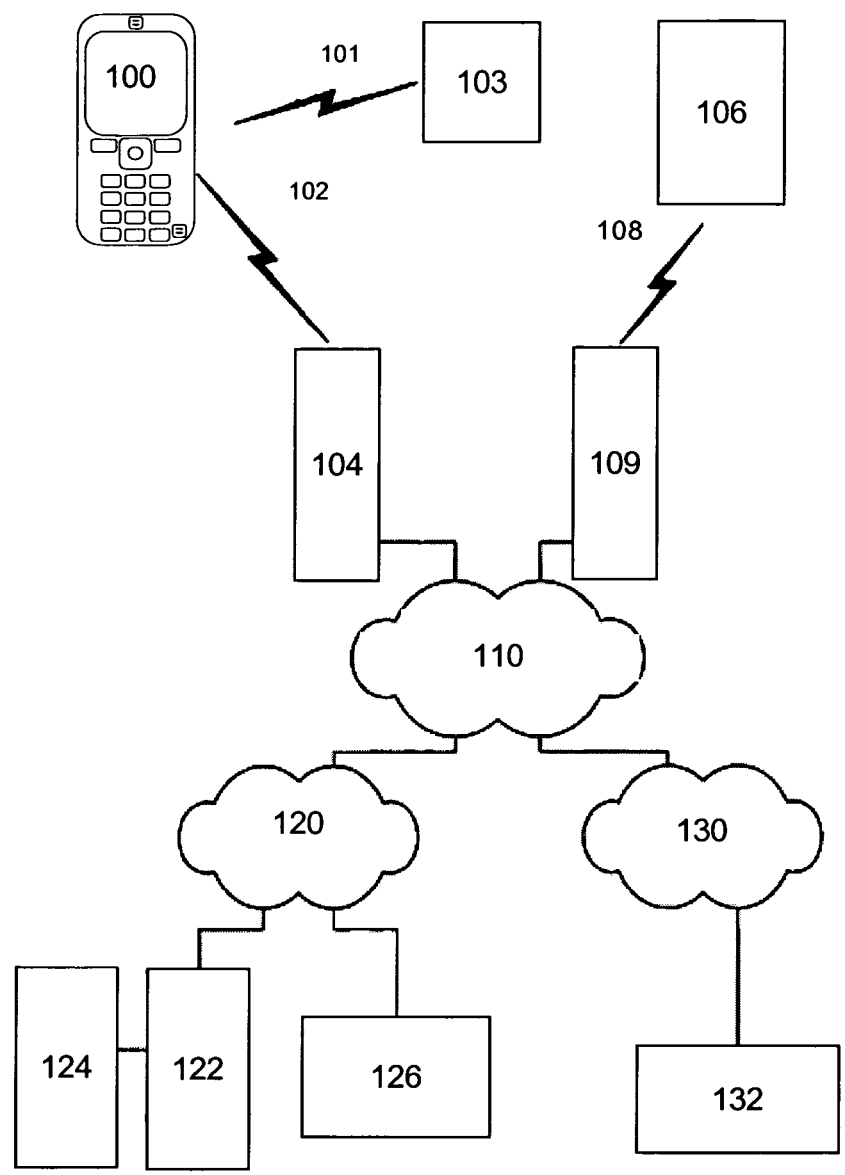
FIG. 1 is an overview of a telecommunications system in which a device according to the present application is used according to an embodiment.

FIG. 1 illustrates an example of a cellular telecommunications system in which the teachings of the present application may be applied. In the telecommunication system of FIG. 1, various telecommunications services such as cellular voice calls, www/wap browsing, cellular video calls, data calls, facsimile transmissions, music transmissions, still image transmissions, video transmissions, electronic message transmissions and electronic commerce may be performed between a mobile terminal 100 according to the teachings of the present application and other devices, such as another mobile terminal 106 or a stationary telephone 132. It is to be noted that for different embodiments of the mobile terminal 100 and in different situations, different ones of the telecommunications services referred to above may or may not be available; the teachings of the present application are not limited to any particular set of services in this respect.

The mobile terminals 100, 106 are connected to a mobile telecommunications network 110 through RF links 102, 108 via base stations 104, 109. The mobile telecommunications network 110 may be in compliance with any commercially available mobile telecommunications standard, such as GSM, UMTS, D-AMPS, CDMA2000, FOMA and TD-SCDMA.

The mobile telecommunications network 110 is operatively connected to a wide area network 120, which may be Internet or a part thereof. An Internet server 122 has a data storage 124 and is connected to the wide area network 120, as is an Internet client computer 126. The server 122 may host a www/wap server capable of serving www/wap content to the mobile terminal 100.

A public switched telephone network (PSTN) 130 is connected to the mobile telecommunications network 110 in a familiar manner. Various telephone terminals, including the stationary telephone 132, are connected to the PSTN 130.

The mobile terminal 100 is also capable of communicating locally via a local link 101 to one or more local devices 103. The local link can be any type of link with a limited range, such as Bluetooth, a Universal Serial Bus (USB) link, a Wireless Universal Serial Bus (WUSB) link, an IEEE 802.11 wireless local area network link, an RS-232 serial link, etc. The local devices 103 can for example be various sensors that can communicate measurement values to the mobile terminal 100 over the local link 101.

Figure 2:
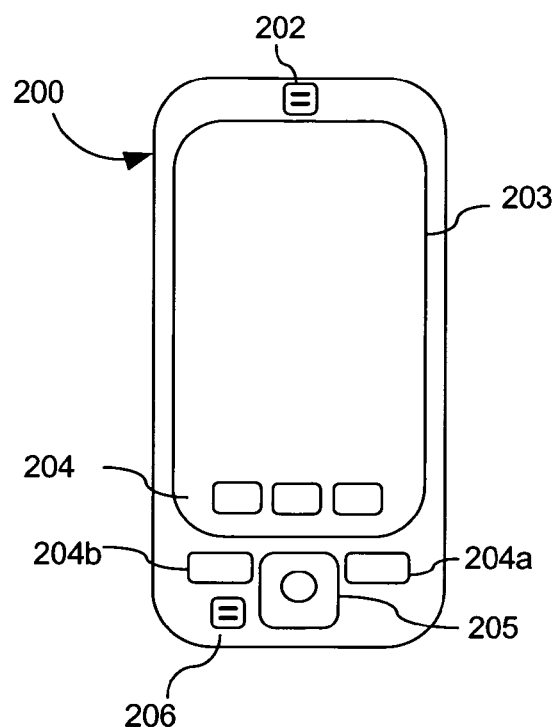
FIG. 2 is a plane front view of a device according to an embodiment.

An embodiment 200 of the mobile terminal 100 is illustrated in more detail in FIG. 2. The mobile terminal 200 comprises a speaker or earphone 202, a microphone 206, a display 203 and a set of keys 204 which may include a keypad of common ITU-T type (alpha-numerical keypad representing characters "0"-"9", "*" and "#") or other physical keys 204*a* and 204*b* and certain other keys such as soft keys 204, and a joystick 205 or other type of navigational input device. The mobile phone also comprises granulated tactile surface, GTS, arranged on the backside of the mobile phone 200 (shown in FIG. 4 as 401). The granularity of the GTS is arranged to correspond to the pixels in the display.

Figure 3:
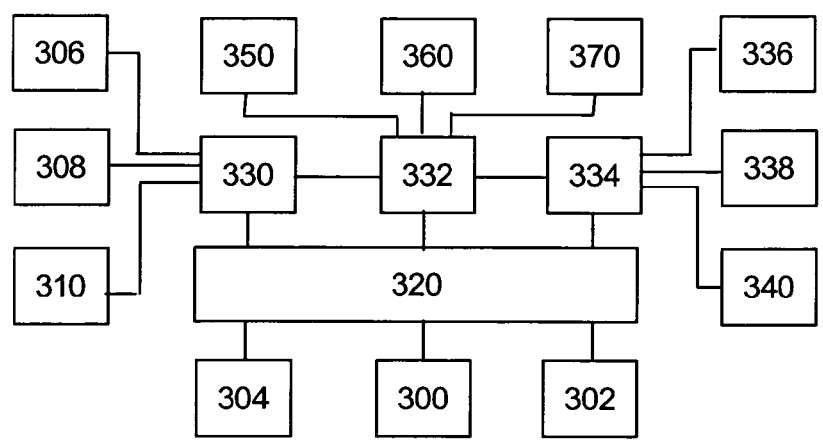
FIG. 3 is a block diagram illustrating the general architecture of a device of FIG. 1 in accordance with the present application, FIG. 4 *a* is a plane front view of a device, *b* and *c* are plane back views of a device and *d* is a plane view of a device being held by a user according to an embodiment, FIG. 5 are schematical drawings of a pixelated tactile surface according to an embodiment.

The internal component, software and protocol structure of the mobile terminal 200 will now be described with reference to FIG. 3. The mobile terminal has a controller 300 which is responsible for the overall operation of the mobile terminal and may be implemented by any commercially available CPU ("Central Processing Unit"), DSP ("Digital Signal Processor") or any other electronic programmable logic device. The controller 300 has associated electronic memory 302 such as RAM memory, ROM memory, EEPROM memory, flash memory, or any combination thereof. The memory 302 is used for various purposes by the controller 300, one of them being for storing data used by and program instructions for various software in the mobile terminal. The software includes a real-time operating system 320, drivers for a man-machine interface (MMI) 334, an application handler 332 as well as various applications. The applications can include a calendar application 350, a notepad application 360, as well as various other applications 370, such as applications for voice calling, video calling, sending and receiving Short Message Service (SMS) messages, Multimedia Message Service (MMS) messages or email, web browsing, an instant messaging application, a phone book application, a calendar application, a control panel application, a camera application, one or more video games, a notepad application, etc.

The MMI 334 also includes one or more hardware controllers, which together with the MMI drivers cooperate with the display 336/203, a granulated tactile surface 340/401, the keypad 338/204 as well as various other I/O devices such as microphone, speaker, vibrator, ringtone generator, LED indicator, etc. As is commonly known, the user may operate the mobile terminal through the man-machine interface thus formed.

The software also includes various modules, protocol stacks, drivers, etc., which are commonly designated as 330 and which provide communication services (such as transport, network and connectivity) for an RF interface 306, and optionally a Bluetooth interface 308 and/or an IrDA interface 310 for local connectivity. The RF interface 306 comprises an internal or external antenna as well as appropriate radio circuitry for establishing and maintaining a wireless link to a base station (e.g. the link 102 and base station 104 in FIG. 1). As is well known to a man skilled in the art, the radio circuitry comprises a series of analogue and digital electronic components, together forming a radio receiver and transmitter. These components include, band pass filters, amplifiers, mixers, local oscillators, low pass filters, AD/DA converters, etc.

The mobile terminal also has a SIM card 304 and an associated reader. As is commonly known, the SIM card 304 comprises a processor as well as local work and data memory.

Figure 4A:
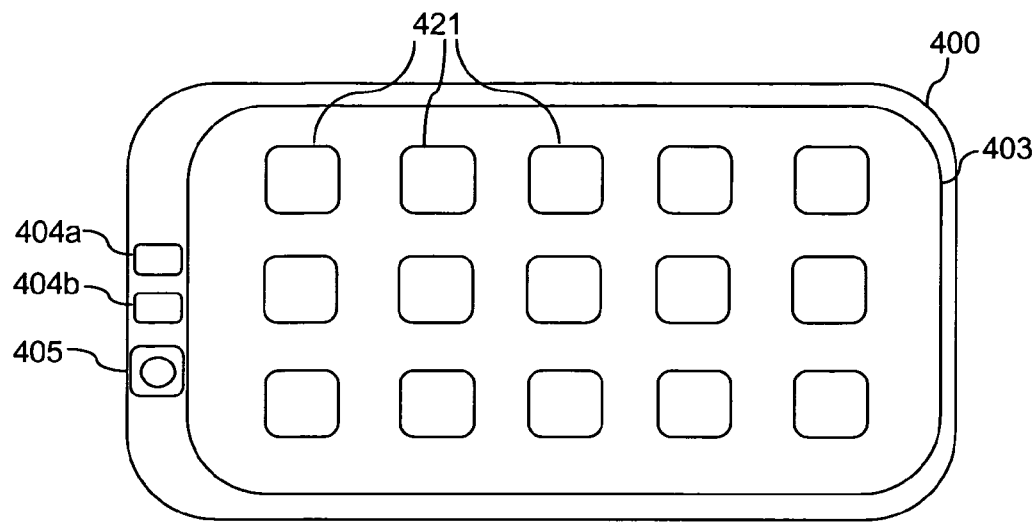

FIG. 4A show a mobile terminal 400 according to an embodiment. The mobile terminal 400 has a display 403 in a landscape orientation making the mobile terminal 400 suitable for web browsing. As for the terminal in FIG. 2 the mobile terminal 400 has physical keys 404a and b and a navigation key 405. These keys 404 and 45 can be used to navigate a webpage or a menu system shown on the display 403. On the display 403 a series of icons 421 are shown representing a menu structure of the mobile terminal 400. Naturally any visual image could be displayed on the display 403 such as a web page or a media file.

Figure 4B:
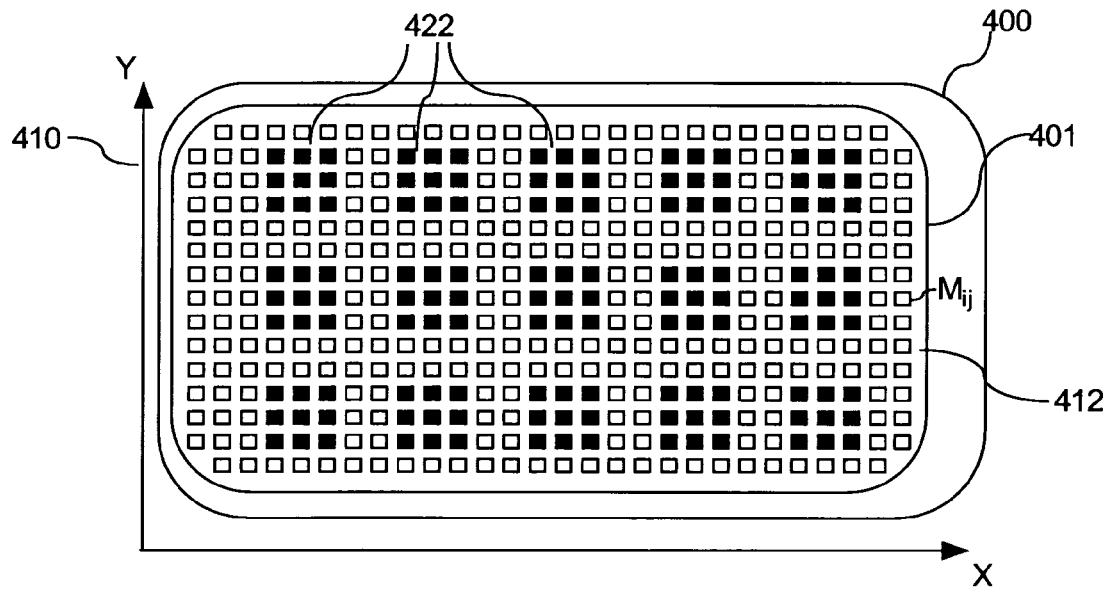

FIG. 4B show the backside of the mobile terminal 400 where a granulated tactile surface, GTS, 401 is arranged. The GTS 401 has an array of elements capable of vibrating when activated, hereafter referred to as vibrator elements or vibra-actuators, Mij on a bottom layer 412. The vibra-actuators Mij can be thought of as being arranged in a coordinate system 410 having a vertical Y- and a horizontal X-axis. The denotation Mij thus indicate vibra-actuator M at position (X=i: Y=j) in the coordinate system 410. The GTS 401 is arranged so that the vibra-actuators Mij are position in alignment with the display 403 so that the outer edges of the display 403 coincide with the outer edges of the GTS 401.

Each of the vibra-actuators Mij is associated with at least one pixel or a group of pixels. The number of pixels associated with each vibra-actuator depends on the resolution of the display 403 and the resolution of the GTS 401. For a display having a resolution of 640×480 and a GTS having a resolution of 320×240 four pixels will be associated with each vibra-actuator Mij.

Different algorithms can be used to determine whether a vibra-actuator should be activated or not depending on the pixel group. If all pixels indicate activation the vibra-actuator should be activated, and likewise if none of the pixels indicate an activation the associated vibra-actuator Mij should be kept inactive. However, when some of the pixels indicate activation and some do not different schemes can be used. Either a logical or function can be used stating that if one pixel indicates activation the vibra-actuator Mij is activated.

Alternatively, a voting scheme can be used so that if more than half, a third or two-thirds of the pixels indicate activation the associated vibra-actuator Mij should be activated. Other fractions such as ¼, ⅕, ⅙, ⅐ or multiples thereof are of course also possible and are up to the designer to decide.

Additionally or alternatively a proportional scheme can be used in that the number or fraction of pixels in a group indicating that the vibra-actuator Mij should be activated determines which frequency the vibra-actuator Mij should be activated to. The more pixels that indicate activation the higher the frequency should be.

In FIG. 4B some of the vibra-actuators Mij are actuated to vibrate, these 422 are marked in black. As can be seen the active vibra-actuators 422 coincide with the icons 421 being displayed on the display 403 thereby conveying a tactile representation of the visual image. This tactile representation of the visual image could also be described or referred to as a tactile image as it provides the user with a mental image of the visual content through a tactile reproduction of the visual content being displayed. This increases the perception of the content being presented to a user and thereby lowers the cognitive effort required in perceiving the content allowing a user to easier, and more intuitively become aware of the presented content or information.

The tactile representation 422 is synchronised with the visual image 421 so that the user can ascertain visual information from the tactile communication channel between the device and the user that is established through the GTS and the tactile representation. The synchronisation and alignment of the visual image and the tactile representation thereof provide a natural orientation to and from a user's fingers while holding the device.

Due to this natural coupling a user will be able to feel the same as he is seeing thereby reducing the cognitive effort required to recognize what is being shown.

Figure 4C:
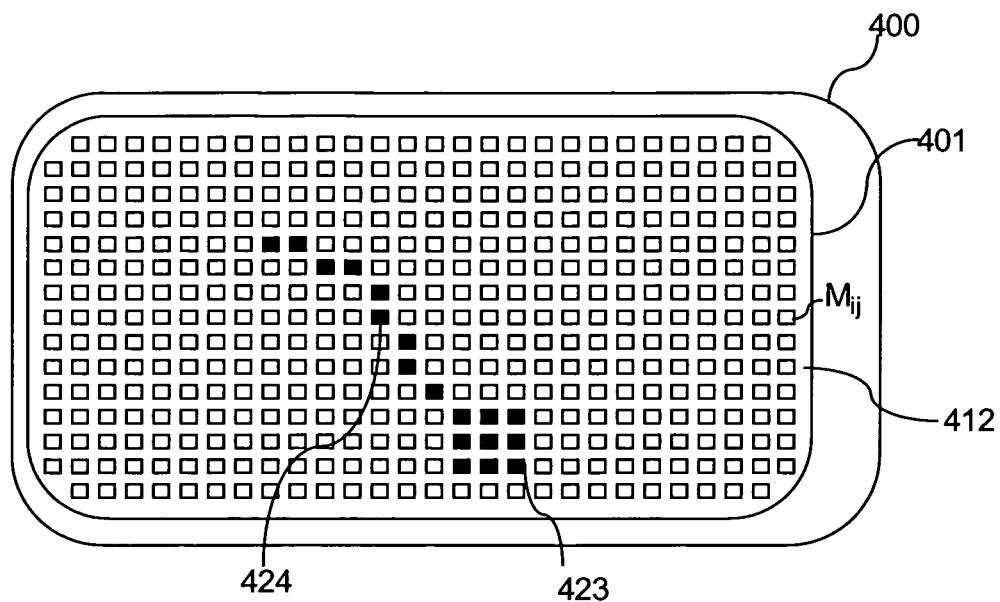

The GTS 401 can also be used to guide a user. As is shown in FIG. 4C a path 424 of vibra-actuators Mij is activated which will guide a user's finger to a certain icon or place 423 on the GTS 401 and thereby guide a user's eye focus to a corresponding place (not shown) on the display 403. As there is an inherent coupling between a human's finger movement and their eyes a user will be able to quickly find the corresponding icon on the display 403 by letting his gaze follow his finger movements. This is a highly intuitive process and thus quick and easy to understand and adapt to. The vibra-actuators making up the path 423 are in this case activated regardless of the content of their associated pixel(s).

By providing such paths 424 the GTS 401 can be used to guide and help a user find the next steps or actions to take. As one action is completed the next possible or recommended actions are provided with a tactile path 424 leading to them. This helps the user find which icons or soft keys that are possible or recommended to be used next. By using this feature a user when in doubt can drag his fingers across the GTS until a line is found, such a line indicates a path to a next possible action. The user is thus informed in a very intuitive and quick way of what the next possible or recommended actions are.

The items 423 that are recommended or possible as next actions to be taken can also be set to vibrate more intensively so that they are more easily recognised.

Figure 4D:
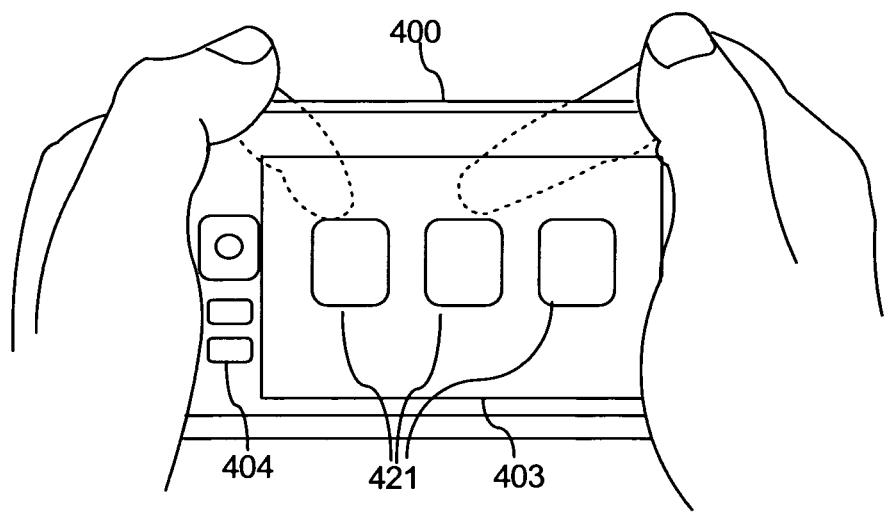

FIG. 4D show a mobile terminal 400 being held by a user. On the display 403 three icons or objects 421 are shown. A corresponding three tactile objects are conveyed to the GTS 401 (not shown in FIG. 4D) which the user can feel with his fingers grasping the back side of the mobile terminal 400.

By creating a tactile representation of a visual image visual information is conveyed to the tactile GTS 401 and the user is fed the same information through both a visual channel from the display 403 and a tactile channel from the GTS thereby doubling the sensory input alleviating the cognitive effort required if only the visual input was to be interpreted by a user.

FIG. 5 show an example of how a granulated tactile surface, GTS can be implemented. In FIG. 5A the vibra-actuators Mij are arranged in a matrix on a layer 512 that can be resistive. Additionally an outer layer 512a can also be used to shield the vibra-actuators Mij from dust and other particles and to protect the user from any electrical shock that may escape the vibra-actuators Mij. The layer 512 has substantially the same extent as the GTS 401 of FIG. 4 and can be the supportive member of the GTS 401 as is shown by indication 412 in FIG. 4. The same coordinate system 510 as shown in FIG. 4B as 410 is used for FIG. 5A. Across the bottom layer 512 a series of horizontal connecting wires 513a-d are drawn. In each end of these connecting wires 513a-d there is a connector 514a-d. Each vibra-actuator Mij is connected to one of these horizontal connecting wires 513a-d and also to one of a series of vertical connecting wires 515a-d arranged across the GTS 401 perpendicular to the horizontal connecting wires 513a-d. In each end of these vertical connecting wires there is also a connector 516*a-d*. Thus to activate the vibra-actuator M23 the corresponding connecting wires 513*c* and 515*c* should be activated. Each vibra-actuator Mij can be made with a piezo-electric vibrator as are known in the art. FIG. 5B show this structure from a side angle.

The vibra-actuators can be set to vibrate at a frequency of 300-400 Hz to for example portray the neutral colour black.

As the human senses are very sensitive to vibrations and can pick up even very weak vibrations only small vibra-actuators are necessary and need only vibrate very softly for a user to feel them. This makes an apparatus according to the teachings herein power efficient and silent.

This arrangement can be used to activate a series of vibra-actuators many at a time or one by one or group by group depending on the visual image to be conveyed as a tactile representation and the vibra-actuators used.

As there would be little change in the perception of the vibration if the vibra-actuator was only active for short periods at a time during its actuation this scheme would work satisfactory.

To enable the granulated tactile surface 401 to show more complex representations another addressing or accessing mode such as direct access can be used.

The array or matrix of vibra-actuators is then covered in a suitable manner for example with a plastic film.

It should be noted that as touch screen devices will become more and more thinner and more sensitive they could be used to cover a GTS thus allowing this technology to be used on the front of a device under whereupon the tactile representation would be conveyed directly under the visual image.

If the outer layer 512*a* covering the GTS 401 is made touch-sensitive the GTS 401 can also be used to input. The outer layer 512*a* would then provide the controller with a position or coordinates and information regarding if a switch or command has been executed, i.e. if it has been pushed.

As a user is guided to an object, as is described with reference to FIG. 4C, or he uses the tactile representation displayed on the GTS 401 in another way the user can select the tactile item corresponding to the sought-for or wanted visual item. An example (with reference to FIG. 4C) is that as a user has written a message text body and is now ready to send it and presses send without having typed in or indicated an addressee or recipient of the message, the corresponding tactile item 423 for the softkey for adding a recipient is provided with a tactile path 424 so the user can easily find his way to the tactile item, press it and thus give the command to add a recipient. After having added a recipient the send button is provided with another tactile path 424 so the user knows that sending is now possible and can execute the send command by simply following the tactile path 424 and pressing on the tactile item 423.

It should be understood that the above also works if the outer layer 512*a* is not touch-sensitive, but is able to propagate touch to the vibra-actuators Mij below, which can then be made touch-sensitive. The ability to propagate touch or pressure is inherent in the outer layer 512*a* as it would otherwise mask the tactile representation being presented on the GTS 401.

The touch-sensitive input can be achieved by measuring the resistance over the vibra-actuators Mij, an increase would mean that it is being pressed on.

FIG. 6 show some of the methods according to the teachings herein and as described above with reference to FIGS. 4 and 5 and below with reference to FIG. 7. FIG. 6A show the basic method of in one step 600 display the visual content and in another step 610 associate each vibra-actuator with a pixel or a group of pixels. Thereafter the vibra-actuators are set to vibrate in step 630 at a level according to information about the pixel or group of pixels 620. This information may relate to the level of illumination or the colour of the pixel or the group of pixels.

Alternatively, see FIG. 6B, a further step 625 of fetching some other information regarding the pixel or group of pixels is performed wherein this information may relate to the status of a visual item being displayed with the pixel or group of pixels, such as the status of an application being represented by an icon. The further information can also be related to help information (in that a vibra-actuator being associated with a visual content item having a help notification available could be made to vibrate at another frequency or intensity than the surrounding vibra-actuators) or guiding information (in that an vibra-actuators associated through the associated visual content of the pixels with a next possible or recommended action could be made to vibrate at a different frequency or at a different intensity than the surrounding vibra-actuators).

The information could also be related to very exceptional levels of illumination in that they are so high that surrounding vibra-actuators should also be activated.

In FIG. 6C an additional or alternative method is described. The method starts as in FIGS. 6A and B and proceeds with the further steps of defining a guide path in the tactile surface step 640 and associating vibra-actuators with this guiding path and activating those 650 to provide a user with a tactile path leading to a specific tactile element corresponding to a visual element. Furthermore, if the GTS 401 as described with reference to FIGS. 4 and 5 is made to be touch sensitive a further step 660 of receiving input through the GTS is effected upon user input.

It should be noted that the numbering in FIG. 6 is only for reference and does not indicate an order in which the steps are to be taken.

FIG. 7 shows a display image 703 that can be part of a movie or other media file. The user is provided with a tactile feel, a tactile representation, of the silhouettes of the objects like the person on a GTS 701 by actuating the corresponding vibra-actuators. The tactile representation in FIG. 7 is shown mirrored to better illustrate the correspondence between the visual image and the tactile representation. Information regarding the different colours or intensity in the picture 703 could also be conveyed to the GTS by activating the corresponding or associated vibra-actuators in dependence on the colour temperature or the intensity. In FIG. 7 the pixels have been associated with one of many vibra-actuators making pixel-vibra-actuator groups 721, 722, 723. One such group 721 consisting of a group of adjacent pixels and a vibra-actuator is in the neck of the person in the image. To convey the haptic or tactile representation of the person a corresponding tactile silhouette is achieved by actuating all the vibra-actuators associated with a pixel group having pixels being part of the person in the image. For conveying or simulating a colour a vibra-actuator could be made to vibrate with a frequency that depends on the colour temperature. For example the hotter the colour is the higher the frequency should be. In FIG. 7 the colour of the sea in the background is conveyed to the tactile representation by actuating the vibra-actuators associated with a pixel group 723 having pixels being part of the sea. These vibra-actuators are actuated to vibrate at a different frequency than the vibra-actuators 721 making up the silhouette. The intensity of a pixel could also be conveyed by a varying frequency where a high intensity would lead to a high frequency. The vibra-actuator associated with the pixel group 722 showing the sun in the display image 703 is set to vibrate at a higher frequency than the other vibra-actuators 721, 723.

This tactile representation that is achieved increase the viewing experience of the display image. For example a user could be allowed to feel the movement of the waves on the GTS while looking at a movie clip about the sea. The enhanced user experience will be further discussed below with reference to FIG. 8.

Figure 8:
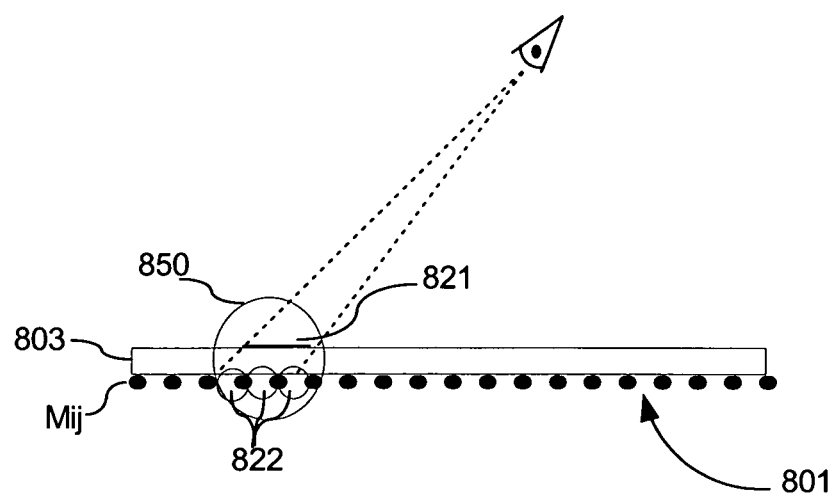
FIG. 8 is a schematic view of a granulated tactile surface and a display being associated to each other according to an embodiment.

FIG. 8 show a schematic view of a GTS 801 arranged under (either directly or adjacent) a display 803 and how the vibrating elements Mij of the GTS 801 correspond to pixels or graphics on the display 803. From a user perspective a displayed graphic or visual element 821 overlaps one or more vibrator elements Mij which are activated (indicated by circles) and thus forms a tactile representation 822 of the visual content. If the overlapping is dislocated a little bit the visual content will appear to overlap when viewed at an angle thereby forming a video-tactile grouping volume or entity 850 that is easy to perceive by a user requiring a minimum of cognitive effort. The combination of the display 803 and the GTS 801 can be said to form an information perceiving zone. Video-tactile coupling or grouping made in this way provide a naturally enriched interaction of granulated video tactile information by allowing a user to both see and touch the content at a natural viewing angle.

The size of these pixel groups depend on relationship between the resolution of the display and the resolution of the GTS 701. The higher the resolution of the GTS 701 i.e. the finer the granularity is, the smaller the pixel groups should be.

Alternatively, a pixel's intensity could be simulated by the force of the vibration if the vibra-actuator is designed for this. Thus a combination could simulate or convey both a colour temperature and a pixel's intensity by increasing or decreasing both the force and the frequency of the vibra-actuator.

The colour of a pixel, the intensity and whether it is displaying an object or not can be referred to as the pixel's level of illumination.

Conveying a tactile representation of a visual image has many advantages in that it allows a user to better understand the content of the visual image. It need not be an image as in FIG. 7 but can of course also be a representation of a device's status or a menu structure shown via a graphical user interface GUI.

It should be noted that if the GTS is combined with a touch pad or other touch sensitive means it can also be used to input commands to the terminal. A user can then find the tactile version of the visual content and activate it with his fingers. This makes it easy for the same terminal to be used in environments where vision is impaired as well when vision is clear.

The various aspects of what is described above can be used alone or in various combinations. The teaching of this application may be implemented by a combination of hardware and software, but can also be implemented in hardware or software. The teaching of this application can also be embodied as computer readable code on a computer readable medium. It should be noted that the teaching of this application is not limited to the use in mobile communication terminals such as mobile phones or mobile web browsers, but can be equally well applied in Personal digital Assistants (PDAs), game consoles, MP3 players, personal organizers or any other device designed for providing information such as, but not limited to, digital books.

The teaching of the present application has numerous advantages. Different embodiments or implementations may yield one or more of the following advantages. It should be noted that this is not an exhaustive list and there may be other advantages which are not described herein.

One advantage of the teaching of this application is that a user is provided with information that requires less cognitive effort to interpret thereby making the device easier to use and operate.

Another advantage of the teaching of the present application is that the perception of a visual image or its content can be enhanced adding to the user experience of a device according to the teachings herein.

Although the teaching of the present application has been described in detail for purpose of illustration, it is understood that such detail is solely for that purpose, and variations can be made therein by those skilled in the art without departing from the scope of the teaching of this application.

For example, although the teaching of the present application has been described in terms of a mobile terminal in the form of a mobile telephone or a mobile web browser, it should be appreciated that the teachings of the present application may also be applied to other types of electronic devices, such as music players, palmtop computers or any of the devices mentioned above and herein and the like. It should also be noted that there are many alternative ways of implementing the methods and apparatuses of the teachings of the present application.

The term "comprising" as used in the claims does not exclude other elements or steps. The term "a" or "an" as used in the claims does not exclude a plurality. A unit or other means may fulfil the functions of several units or means recited in the claims.

The invention claimed is:

1. A user interface comprising a display arranged to display visual content and a tactile surface arranged to convey a tactile representation,
    wherein said tactile representation is based on said visual content,
    wherein said display is arranged on a front side of said user interface and said tactile surface is arranged on a back side of said user interface opposite to said front side of said user interface, wherein said tactile surface comprises a plurality of vibrator elements, and wherein said vibrator elements are piezoelectric elements,
    wherein the visual content comprises a displayed and
    wherein the tactile representation comprises a vibrating silhouette of the displayed object.

2. A user interface according to claim 1, wherein each vibrator element being associated with at least one pixel of said display, said at least one pixel having a level of illumination and wherein said vibrator element is arranged to be activated according to said associated at least one pixel's level of illuminati thereby forming a tactile representation of said visual content.

3. A user interface according to claim 1, wherein said tactile surface is further arranged to convey information relating to said visual content.

4. A user interface accordion to claim 3, wherein said information is related to at least one of a status, help and guide information feature.

5. A user interface according to claim 4, wherein said tactile surface is arranged to generate a guiding path by activating at least one of said plurality of vibrator elements irrespective of said visual content.

6. A user interface according to claim 1, wherein said tactile surface is further arranged to receive touch input.

7. A user interface according to claim 1, wherein said tactile surface has a spatial extent in the same plane as said back side of said user interface and
    said display has a spatial extent in the same plane as said front side of said user interface and wherein said spatial extents substantially overlaps each other when viewed at a straight angle from said front side and wherein each of said plurality of vibrator elements is associated with at least one pixel which overlaps with said vibrator element's position on said tactile surface when viewed at a straight angle from said front side so that said tactile representation corresponds spatially to said displayed visual content.

8. A device comprising a user interface according to claim 1.

9. A method for providing a tactile representation of a visual content on a display comprising associating a tactile surface with said visual content wherein said display is arranged on a front side of a device and said tactile surface is arranged on a back side of said device opposite to the front side of said device, wherein said tactile surface comprises a plurality of vibrator elements, and wherein said vibrator elements are piezoelectric elements, wherein the visual content comprises a displayed object and the tactile representation comprises a vibrating silhouette of the displayed object.

10. A method according to claim 9 for providing tactile representation of visual content in an apparatus, said apparatus comprising a display having a plurality of pixels each having level of illumination, said method comprising:

associating at least one said vibrator elements with at least one pixel and activating said vibrator elements according to said associated at least one pixel's level of illumination.

11. A method ac to claim 10, further comprising activating at least one of said plurality of vibrator elements regardless of an associated pixel's level of illumination to convey information regarding said visual content to a user.

12. A method according to claim 11, wherein said information is related to at least one of a status of said visual content and an item associated with said visual content.

13. A method according to claim 11, wherein said information is related to guidance information for an item associated with said visual content.

14. A method according to claim 10, further comprising activating at least one vibrator element adjacent to an activated vibrator element to form a tactile path leading to said activated vibrator element.

15. A method according to 14, wherein said activated vibrator element is indicative of a next action.

16. A method according to 10, wherein said plurality of vibrator elements form a tactile surface and said method further comprising receiving a touch command through said tactile surface.

17. A method according to 10, wherein said level of illumination is dependent on at least one of color and an intensity of said at least one pixel.

18. A non-transitory computer readable medium including at least computer program code for controlling a user interface comprising a display and a tactile surface, said computer readable medium comprising software code for conveying a tactile representation of said visual content on said tactile surface and wherein said display is arranged on a front side of said user interface and said tactile surface is arranged on a back side of said user interface opposite to the front side of said user interface, wherein said tactile surface comprises a plurality of vibrator elements, and wherein said vibrator elements are piezoelectric elements, wherein the visual content comprises a displayed object and the tactile representation comprises a vibrating silhouette of the displayed object.

19. A device arranged to read a computer readable medium according to claim 18 and execute said software code.

* * * * *

UNITED STATES PATENT AND TRADEMARK OFFICE
CERTIFICATE OF CORRECTION

| | | |
|---|---|---|
| PATENT NO. | : 8,766,786 B2 | Page 1 of 1 |
| APPLICATION NO. | : 12/866237 | |
| DATED | : July 1, 2014 | |
| INVENTOR(S) | : Radivojevic | |

It is certified that error appears in the above-identified patent and that said Letters Patent is hereby corrected as shown below:

In the Claims:

Claim 1, col. 12, line 41 insert --object-- in-between "displayed" and "and".

Claim 2, col. 12, line 49 "illuminati" should be deleted and --illumination-- should be inserted.

Claim 4, col. 12, line 54 "accordion" should be deleted and --according-- should be inserted.

Claim 11, col. 13, line 29 "ac" should be deleted and --according-- should be inserted.

Signed and Sealed this
Thirtieth Day of September, 2014

Michelle K. Lee
*Deputy Director of the United States Patent and Trademark Office*